US010191364B2

(12) United States Patent
Christensen

(10) Patent No.: US 10,191,364 B2
(45) Date of Patent: *Jan. 29, 2019

(54) DEVICE AND METHOD FOR OMNIDIRECTIONAL IMAGE DISPLAY

(71) Applicant: 360Brandvision, Inc., Las Vegas, NV (US)

(72) Inventor: Olav Christensen, Brooklyn, NY (US)

(73) Assignee: 360Brandvision, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/743,074

(22) Filed: Jun. 18, 2015

(65) Prior Publication Data

US 2015/0286128 A1 Oct. 8, 2015

Related U.S. Application Data

(63) Continuation of application No. 13/624,160, filed on Sep. 21, 2012, now Pat. No. 9,091,911.

(60) Provisional application No. 61/538,366, filed on Sep. 23, 2011.

(51) Int. Cl.

| G03B 21/10 | (2006.01) |
|---|---|
| G03B 21/28 | (2006.01) |
| G03B 21/16 | (2006.01) |
| G03B 21/62 | (2014.01) |
| G03B 37/04 | (2006.01) |
| G09F 19/12 | (2006.01) |
| G09F 19/18 | (2006.01) |
| H04N 9/31 | (2006.01) |
| G09G 3/00 | (2006.01) |

(52) U.S. Cl.
CPC ............ *G03B 37/04* (2013.01); *G03B 21/10* (2013.01); *G03B 21/28* (2013.01); *G09F 19/12* (2013.01); *G09F 19/18* (2013.01); *G09G 3/00* (2013.01); *H04N 9/31* (2013.01); *H04N 9/3144* (2013.01); *H04N 9/3147* (2013.01)

(58) Field of Classification Search
CPC ............ G02B 27/2235; G02B 27/2271; G02B 27/2292; G03B 35/20; G03B 21/10; G03B 21/28; G03B 37/04; G09F 19/12; G09F 19/18; H04N 9/31; H04N 9/3147
See application file for complete search history.

(56) References Cited

U.S. PATENT DOCUMENTS

| 6,817,716 | B1 * | 11/2004 | Hines | ...................... | A47F 11/06 |
| | | | | | 348/E5.143 |
| 7,134,756 | B2 * | 11/2006 | Drucker | ................. | G03B 21/28 |
| | | | | | 348/E5.137 |

(Continued)

*Primary Examiner* — Xuemei Zheng
(74) *Attorney, Agent, or Firm* — Mark S. Leonardo; Brown Rudnick LLP

(57) ABSTRACT

The invention generally relates to the display of images viewable from any direction and devices therefor. In some aspects, the invention provides an apparatus for displaying a hologram-like image. The apparatus includes an inverted, truncated pyramid bearing semi-reflective facets visible from outside of the apparatus in all horizontal directions. A base frame supports the truncated pyramid, houses an imaging system, and provides image source surfaces that display images beneath each of the facets to be reflected by each of the facets.

13 Claims, 14 Drawing Sheets

(56) References Cited

U.S. PATENT DOCUMENTS

| | | | |
|---|---|---|---|
| 7,614,748 B2* | 11/2009 | Nayar | H04N 13/0242 219/121.69 |
| 2007/0035511 A1* | 2/2007 | Banerjee | G06F 3/011 345/156 |
| 2011/0037952 A1* | 2/2011 | LaDuke | G02B 27/2292 353/28 |

* cited by examiner

DEVICE AND METHOD FOR OMNIDIRECTIONAL IMAGE DISPLAY

CROSS-REFERENCE TO RELATED APPLICATION

This application is a continuation of U.S. patent application Ser. No. 13/624,160, filed Sep. 21, 2012, which application claims the benefit of U.S. Provisional Application Ser. No. 61/538,366, filed on Sep. 23, 2011, the contents of both of which are hereby incorporated by reference in their entirety.

FIELD OF THE INVENTION

The invention generally relates to the display of images viewable from any direction and devices therefor.

BACKGROUND

If you walk through Times Square or a shopping mall you will find that advertisers try every imaginable gimmick to compete for your attention. However, despite the ingenuity employed by advertisers in created ever louder and more colorful signs, people seem largely desensitized to the myriad signs surrounding them.

There have been attempts to stand out from all the sights. For example, people have tried to create three-dimensional displays that can be viewed from multiple directions. U.S. Publications 2011/0234981, 2011/0002038, and 2008/0144175 show systems of reflectors and projectors that can be installed to display an image. U.S. Pat. Nos. 8,046,941, 8,007,109, 7,490,941, and 6,644,816 show other attempts to create novel displays.

However, existing systems are not easily portable and only operate properly with low ambient light. They are not self-contained and take much labor to set up or remove. Commercial settings are generally too brightly-lit for these systems to appear attractively. The structures of prior art systems are unstable and flimsy. For example, in some displays, the heat radiating from the lights melts the glue that hold the screens in place with the result that the screens collapse.

SUMMARY

The invention provides a device that generates an omnidirectional image display in a unit that is easy to move, install, and use and that also is rugged and durable. Units of the invention use an arrangement of screens that reflect images to create a appearance of a three-dimensional figure floating in space. Since the displayed image can be projected, digital technology can be used to show programmable, dynamic, or interactive content. Structures of the display units are optimized for ease and flexibility of installation as well as durability. A system of display screens can be arranged relative to a base unit that houses a projection system and an optional cooling system such that heat from the lighting system does not interfere with the integrity of any screen. Lightweight materials and good construction techniques are described that provide a display unit that can be delivered to a site and operated with minimal instruction or labor. Operation of the display creates a convincing hologram effect, allowing static or motion holograms to be displayed in a visually attractive manner that engages the attention of passerby and effectively communicates an entity's message.

In certain aspects, the invention provides a display unit having a base in which four projectors are mounted facing inwards or outwards, projecting content upwards onto image source screens through the use of minors disposed at angles. Images on the source screens are reflected by facets of a pyramid-like object mounted above the base. The facets of the pyramids are semi-reflective, semi-transparent, and visible from all directions and co-operate to create the effect of viewing a hologram for a person viewing the display. The pyramid-like object and the base include rigid, light-weight frames that are strongly fastened together and optionally fastened to one another. By housing the imaging system in the base of a rigid, strong frame, designs of the invention solve problems associated with the top-heavy and fragile construction. Moreover, the imaging system in the base can include a cooling system, such as one or more of a heat sink, fan, or combination thereof, to solve overheating problems known in prior art devices. Since overheating problems are overcome, the imaging system can include high-powered projectors, allowing the invention to provide a system and method of displaying images in high ambient light such as is found in a retail environment. Further, the image appears as a three-dimensional hologram and objects behind the display unit can be seen through the hologram display, thus creating a visually captivating medium.

In related aspects, the invention provides an apparatus for displaying a hologram-like image. The apparatus includes an inverted, truncated pyramid bearing semi-reflective facets visible from outside of the apparatus in all horizontal directions. A base frame supports the truncated pyramid, houses an imaging system, and provides image source surfaces that display images beneath each of the facets to be reflected by each of the facets. The apparatus may optionally include a computer, a digital media receiver (DMR), a video distribution amplifier (VDA), a cooling system, or a combination thereof to generate the images displayed on the image source surfaces.

In other aspects, the invention provides a display system in which a plurality of N image source surfaces are arranged on a base frame to present images that are reflected from a plurality of N display surfaces on an object such as film stretched over a pyramid-like frame, so that content from the images is visible from all points along an arc extending around the object for more than 180° within a plane. Preferably, the content is viewable from vantage points extending around the system by 360°. The system may further include N electronic image generation units disposed beneath the image source surfaces. The image generation units may be projectors or display screens. The object may be a frame that has a reflective foil (e.g., polyethylene terephthalate) mounted from edge-to-edge to define a number of facets. The image source surface can be mounted within a corresponding base frame with the frame optionally mounted above it. The image generation system can be coupled to a computer in some embodiments.

Preferably, the frame defines four facets—that is, the frame has a pyramidal or inverted truncated pyramid-like shape. Projectors can be mounted within the base frame to operate with N minors that direct a light path from the projectors to the image source screens. The system may include a cooling system, such as a fan and a heat sink mounted within the base frame, to cool the imaging system.

In certain aspects, the invention provides a method of displaying an image viewable from multiple directions. The method includes generating N images using a plurality of N electronic image generation units, presenting images on a plurality of N image source surfaces disposed above the image generation units, and reflecting the images off of a plurality of N display surfaces provided by a pyramid-like object so that content from the images is visible from all points along an arc extending around the object for more than 180° within a horizontal plane (e.g., 360°).

DETAILED DESCRIPTION

Embodiments of the invention integrate a pyramid-like structure with an image-source base in such a way that it acts as one self-contained system. The pyramid-like structure provides a plurality of facets that include a reflective material to operate as image display surfaces, such as a partially reflective material or a semi-reflective material. The reflective material allows passerby to see a reflection of images provided by the image source base. Moreover, the images combine to create the impression of a three-dimensional hologram floating in air. The hologram affect is three-dimensional at least in that passerby perceive that the content of the image is depicted with depth. Further, the content of the image is depicted to be viewed from multiple directions with the result that the viewer can see multiple aspects, or sides, of the depicted content. Moreover, due to the semi-reflective nature of the image display surfaces, a viewer can see content from the images as well as see through to the real-world background behind the visible image content.

Figure 1:
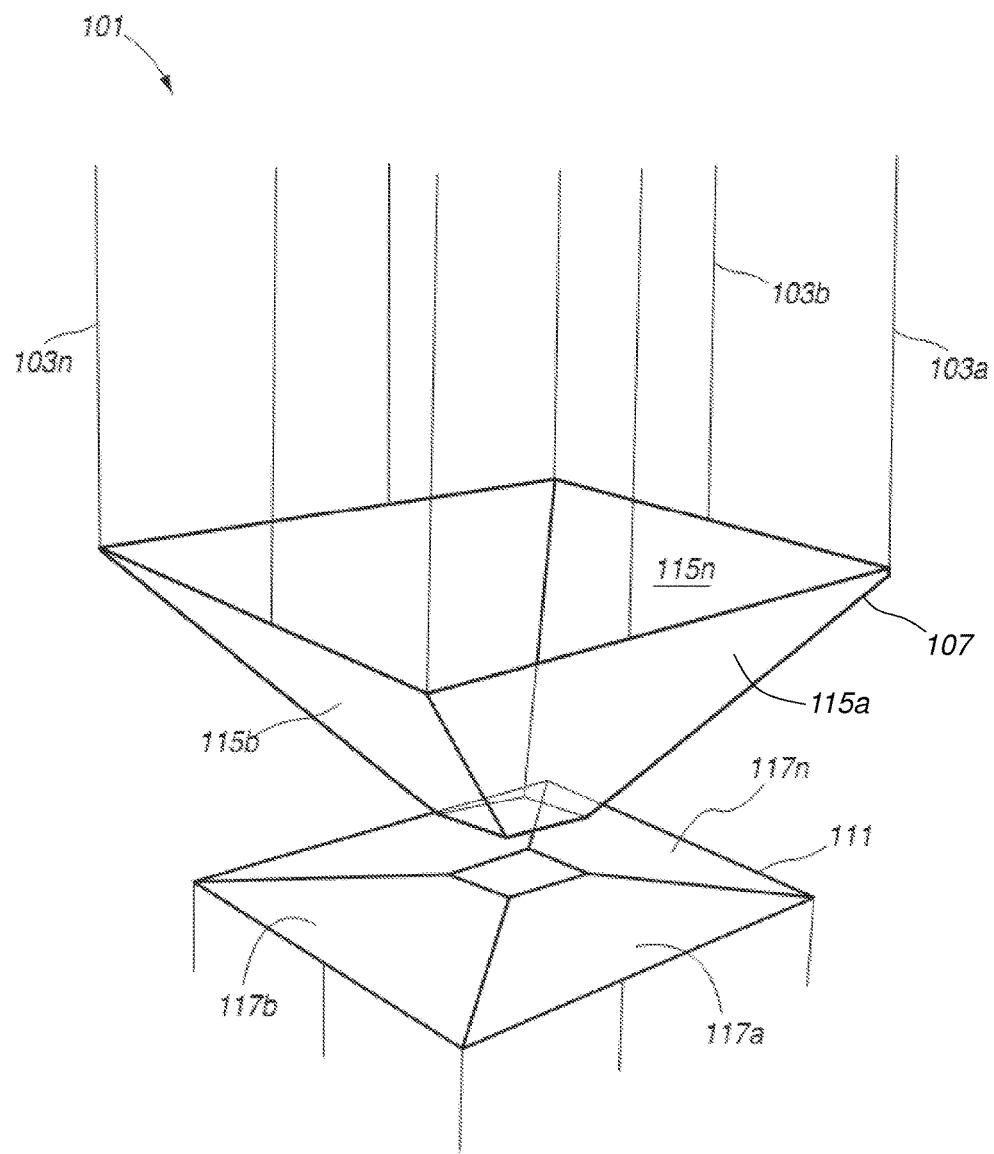
FIG. 1 shows an image display system according to certain embodiments.

FIG. 1 shows an image display system 101 according to embodiments of the invention. Image display frame 107 is disposed above base frame 111. Image display frame 107 provides a plurality of display surfaces 115a, 115b, ..., 115n, each disposed above an image source surface 117a, 117b, ..., 117n. (Where a variable number n of items is described, the index i will be used to indicate any arbitrary one of the items or any number of them (e.g., all) for example, working in concert.) Image source surface 117i displays an image. Image source surface 117i can be, for example, a projection screen or an LED screen. Base frame 111 provides a supporting structure for image source surface 117i as well as houses any image processing and generation components.

Images displayed on image source surface 117i are reflected by display surface 115i on frame 107. As shown in FIG. 1, frame 107 is suspending from a ceiling by suspension cables 103a, 103b, ..., 103n. Any suitable cable may be used including, for example, a stainless steel cable such as a ⅛" galvanized 7×19 aircraft cable, for example, the cable sold under product number AG-30-44-xxx by Griplock Systems, Inc. (Carpentaria, Calif.).

With frame 107 disposed above base frame 111, images presented on image source surface 117i are reflected by display surface 115i and are viewable from outside of the device. For example, a person standing a distance away will see content of the image and it will appear to be suspended in volume of space defined by frame 107 (see FIG. 4). Further, as the person travels around system 101, they will continue to see content from the images. If the images displayed correspond to the various views of the object depicted, the person will perceive the sides of the depicted object or scene as they travel around it. A person may see the content from a series of positions that define an arc around unit 101. With a traditional flat poster, it is difficult to perceive the contents of the poster as you travel around it in an arc greater than about 100°. By definition, it is impossible to perceive the surface of a traditional flat poster from points on an arc spanning greater than 180°. The person viewing a unit 101 of the invention however, can see content of the display along an arc greater than 180°, for example, greater than 270°. In fact, the display is viewable from up to the entire 360° of vantage points around it.

Thus, unit 101 of the present disclosure provides a 360° viewable reflective display system. It uses a reflective material for each of display surface 115a-115n, such as a foil of polyethylene terephthalate (PET) (e.g., 700-1000 gauge super-clear PET foil), attached to a display frame 107 to create a termination point and a reflective display surface 115i in which an image is reflected. As shown in FIG. 4, this creates the illusion of an image being optically displaced and therefore appearing as a hologram. Display frame 107 can be free-standing on the ground (FIG. 3), attached to the base frame 111 (FIG. 9) or appear to be flying from rigging points from a ceiling or other similar area (FIG. 1). Using extension brackets, the footprint of the frame system can be extended from, for example, 10'×10' to 15'×15' (e.g., FIG. 3).

Displays of the invention have valuable and useful applications in advertising, gaming, product design, strategic planning, and numerous other applications. Displays can be installed with attractive finishes to integrate into architectural environments. Lobbies or commercial spaces, for example, can be designed to feature such a display.

Figure 2:
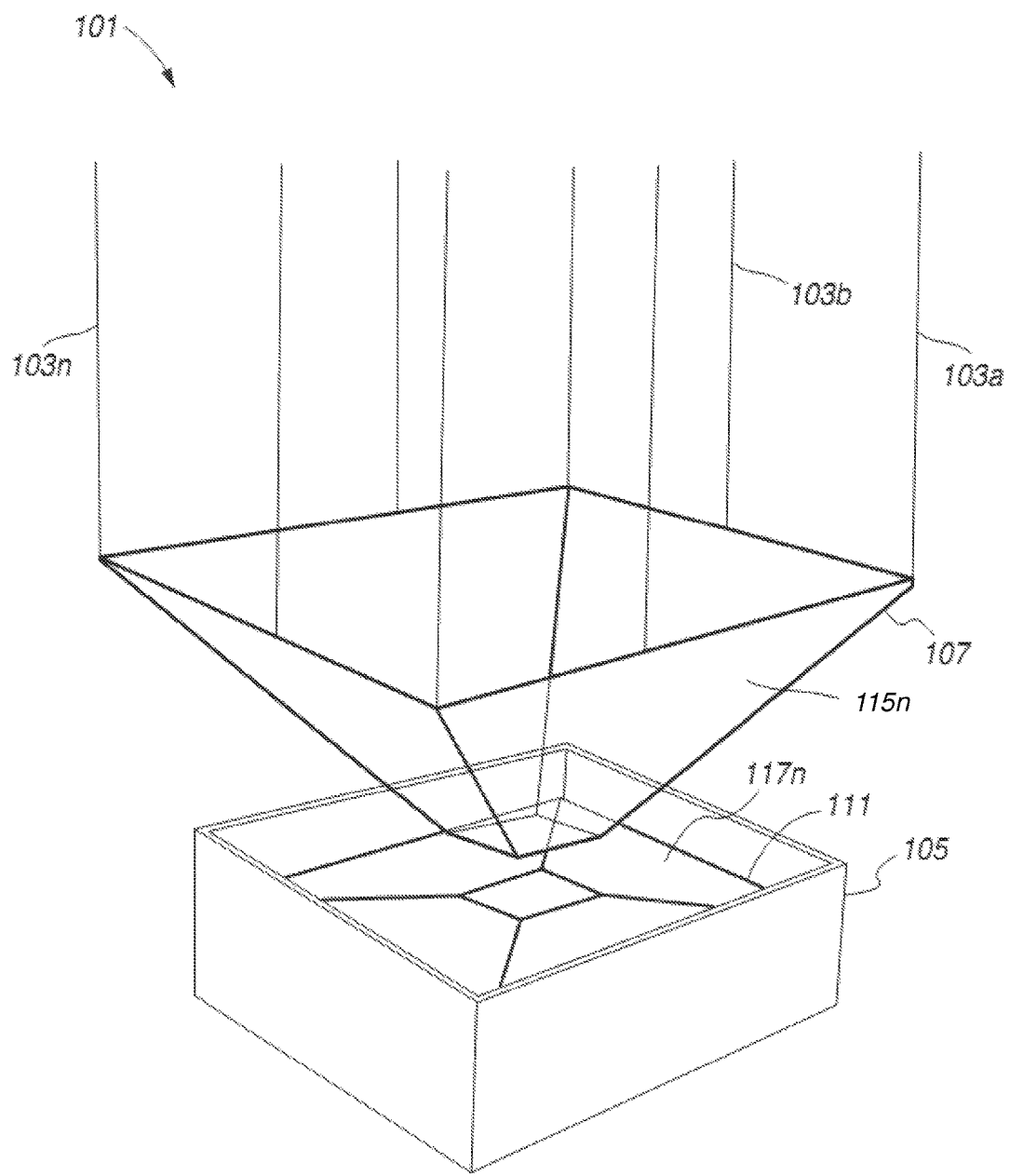
FIG. 2 shows an image display system with a cosmetic skirt.

FIG. 2 shows a display unit 101 with a skirt 105 providing an aesthetically pleasing finish to base frame 111. The aesthetic appearance of unit 101 need not affect the underlying geometry of the operative components of unit 101. In some embodiments, the display surfaces 117a, 117b, ..., 117n are equally-sized polygons (e.g., four polygons) such as triangles or trapezoids. Components such as display surface 117i can be arranged around frame 107 as a prefabricated unit (e.g., FIG. 9) or put into place around a free-standing or floor-standing frame 107.

Figure 3:
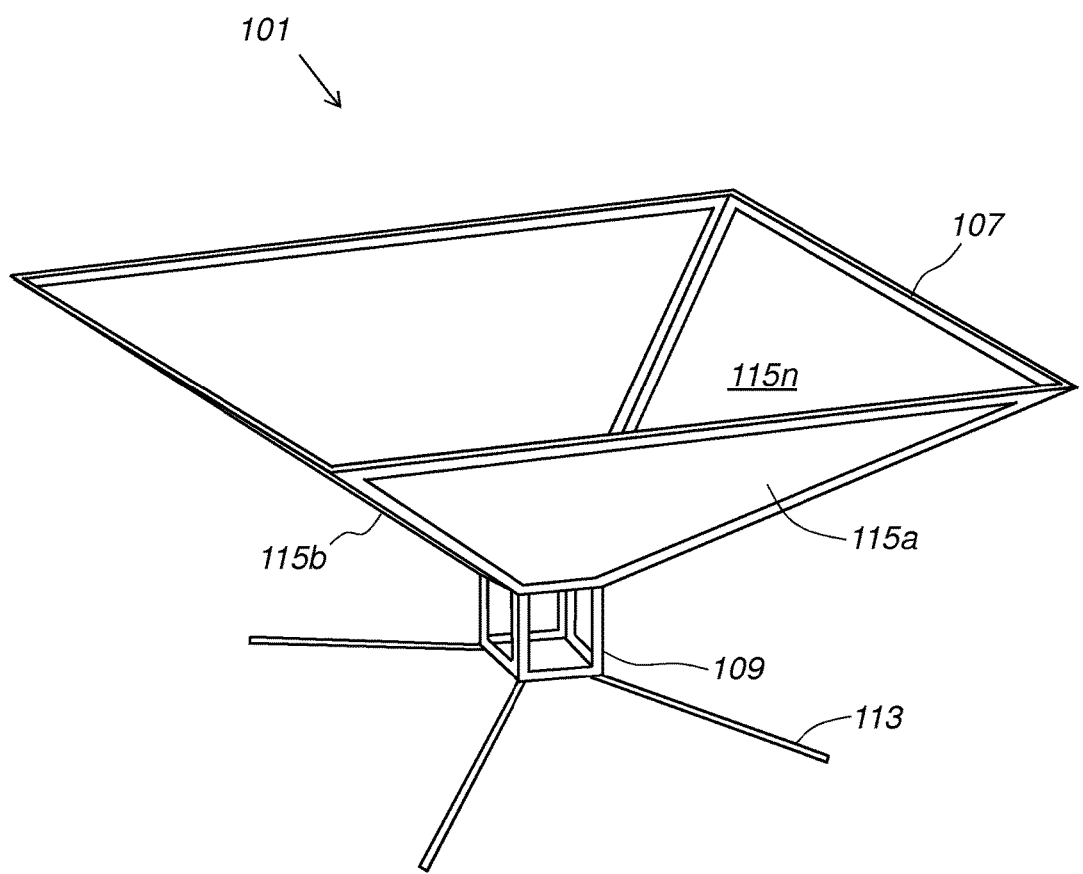
FIG. 3 shows an image display unit frame with floor stand of some embodiments.
Figure 4:
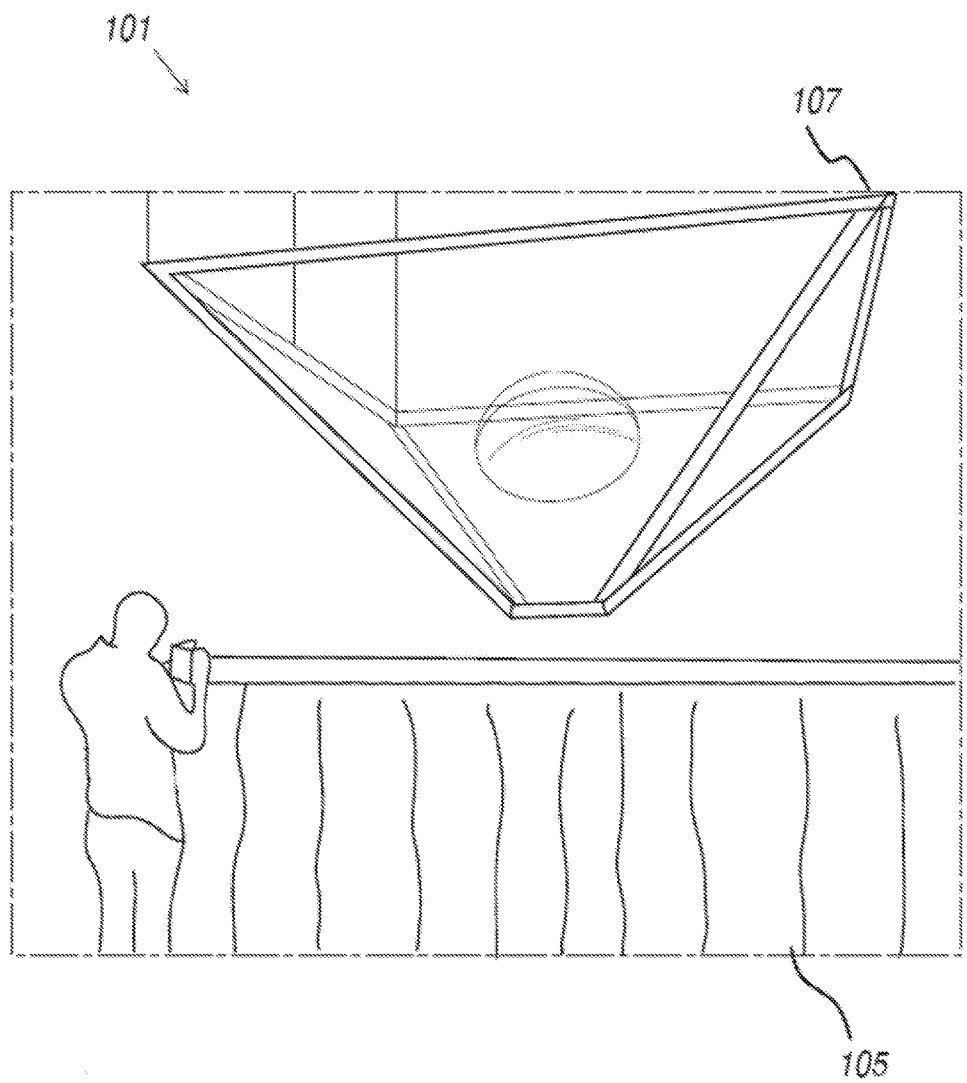
FIG. 4 illustrates an installed, operating display unit.

FIG. 3 shows an image display unit 101 including frame 107 with floor stand 109. Floor stand 109 sits on the floor by means of legs 113, which can be foldable, telescoping, fixed, or removable. A floor-standing version of unit 101 as depicted in FIG. 3 can provide for very rapid set-up with flat-panel LEDs on tilted stands or with rear-projection screens that are arranged under display surface 115i. Or a base frame 111 can be set up and free-standing unit 101 can be set down therein, including optionally covered with skirt 105.

FIG. 4 illustrates a display unit 101 according to embodiments. As seen in FIG. 4, skirt 105 conceals base frame 111, leaving frame 107 exposed for omni-directional viewing.

Figure 5:
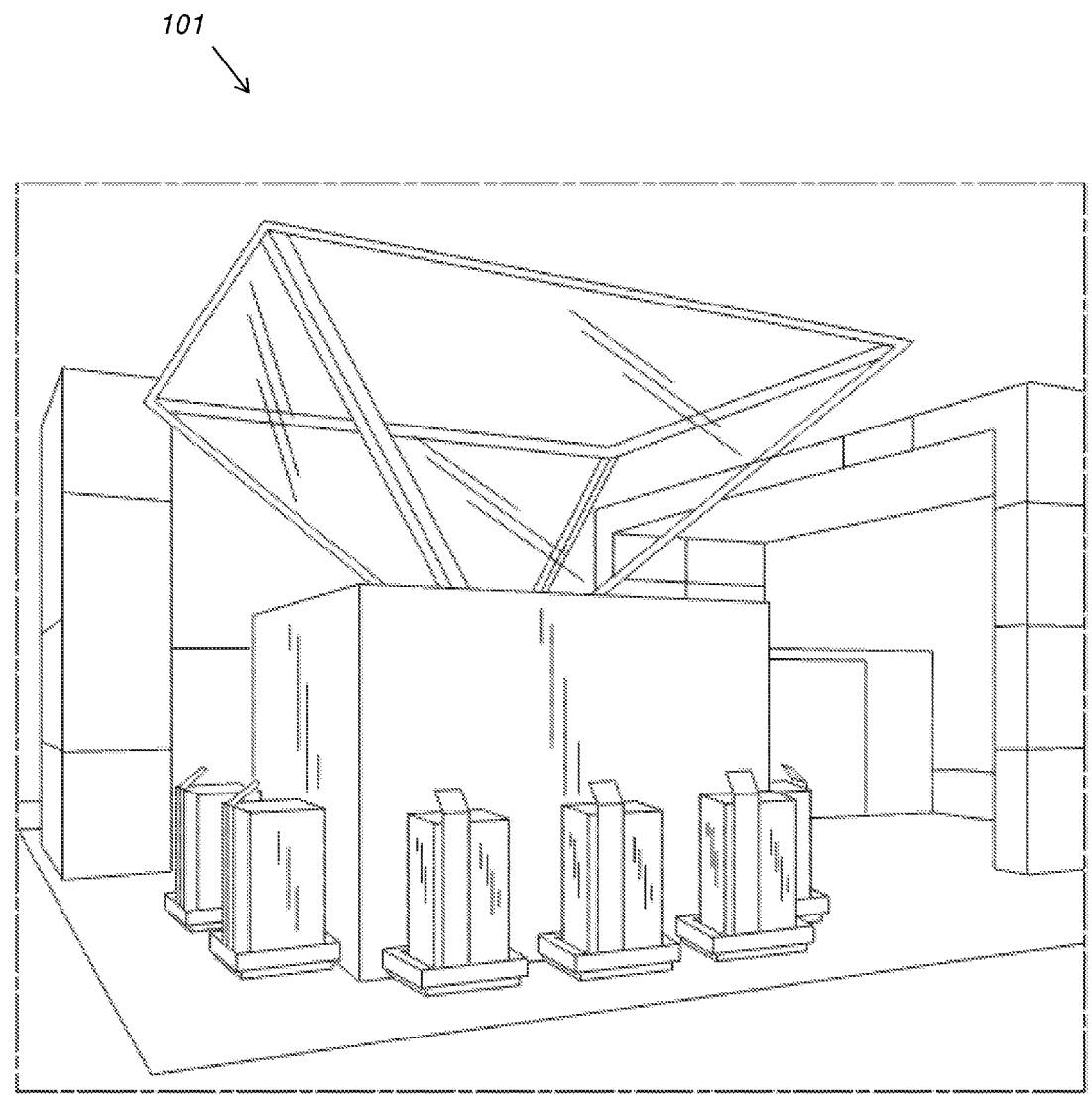
FIG. 5 illustrates an installed, operable display unit.

FIG. 5 illustrates an installed, operating display unit according to embodiments of the invention. Here, frame 107 is large (e.g., has a footprint of about 20'×20') and disposed high above the heads of passerby.

Figure 6:
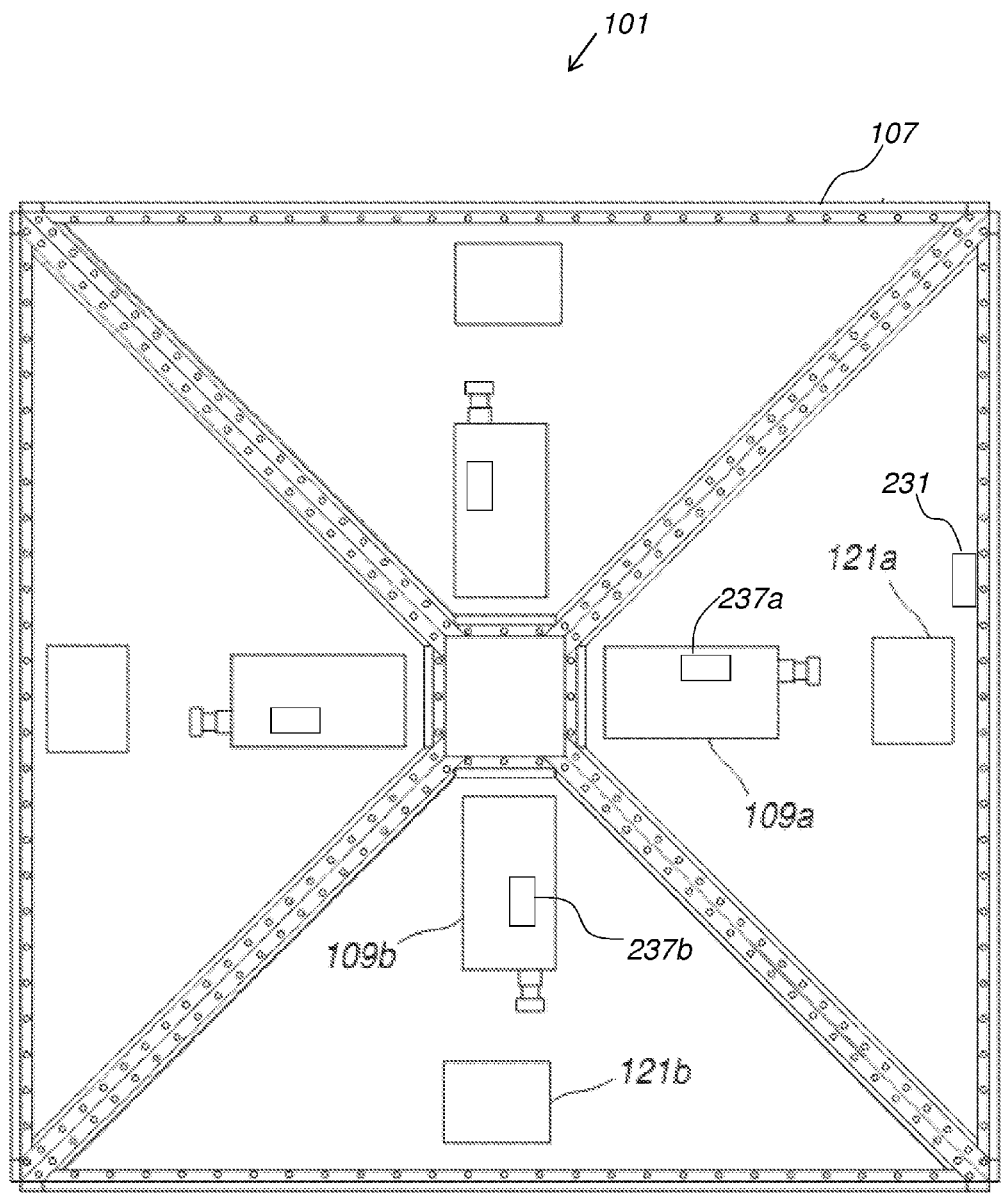
FIG. 6 gives a top-down view of an image display unit.

FIG. 6 gives a top-down view of an image display unit 101 according to certain embodiments. Here, four projectors 109i are pointed outwards, each pointing at a minor 121i that directs a light beam upwards. Each quarter part of the downward-facing area of frame 107 presents a semi-reflective material as image display surface 115i, subtended by source display surface 117i.

Figure 7:
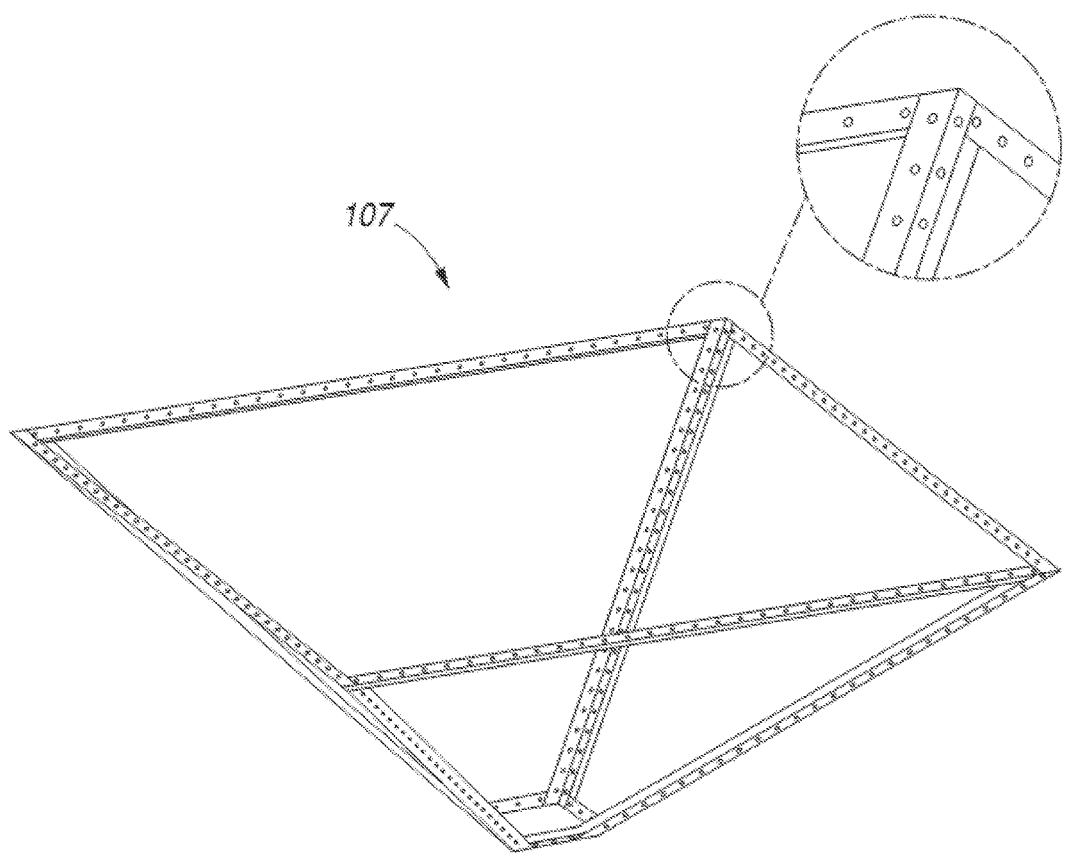
FIG. 7 shows construction of the image frame.

FIG. 7 shows construction of frame 107. Frame 107 can include any suitable material. For example, each post of frame 107 can be wood, plastic, or metal. In some embodiments, each post is galvanized steel, for example, bolted or riveted together at the corners. In certain embodiments, frame 107 is made with galvanized pre-punched angle iron. Suitable construction techniques are discussed in U.S. Pat. No. 5,044,584; U.S. Pat. No. 4,694,519; U.S. Pat. No. 4,514,950; and U.S. Pat. No. 1,545,612, the contents of each of which are incorporated by reference herein in their entirety for all purposes.

Figure 8:
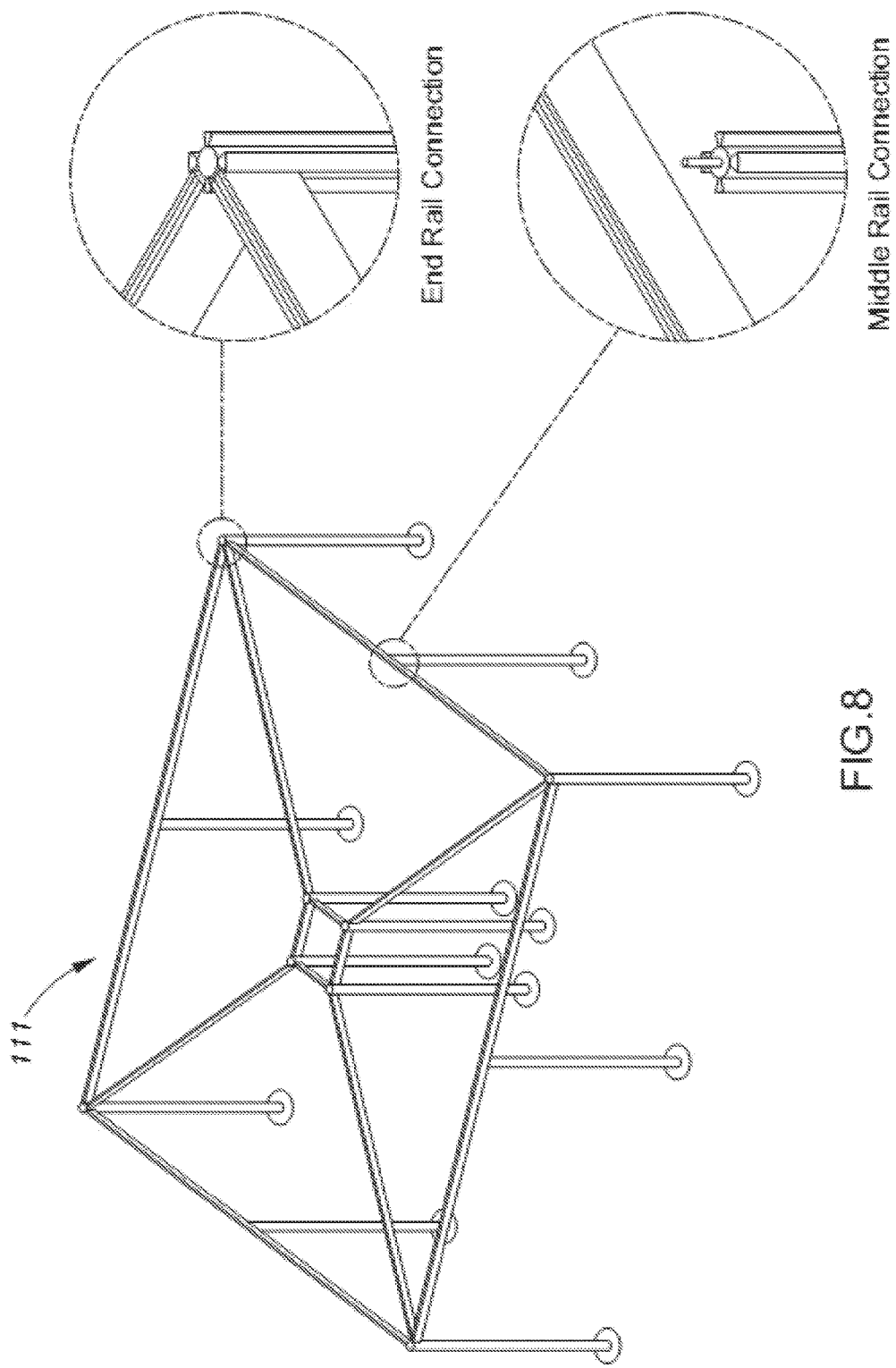
FIG. 8 shows construction of the base frame.

FIG. 8 shows construction of base frame 111. Similar to frame 107, base frame 111 can be formed with wood, plastic, or metal. As shown in FIG. 8, frame 111 is formed using a pre-fabricated post-and-rail assembly kit. In certain embodiments, base frame 111 include aluminum extrusion profile components. Post and rail systems or components are discussed in U.S. Pat. No. 7,731,160; U.S. Pat. No. 6,779,781; U.S. Pat. No. 6,467,756; U.S. Pat. No. 5,913,508; U.S. Pat. No. 3,918,686 and U.S. Pub. 2010/0276653, the contents of each of which are incorporated by reference herein in their entirety for all purposes. Each trapezoidal quadrant of the top surface of base frame 111 can be used to provide a source surface 117i (e.g., FIG. 1).

Each source surface 117 can include a rear-projection screen material, such as is found, for example, in a rear-projection televisions screens or described in U.S. Pat. No. 6,785,048; U.S. Pat. No. 6,346,311; and U.S. Pat. No. 5,033,843, the contents of each of which are incorporated by reference herein in their entirety for all purposes. Exemplary materials for use as a rear-projection screen material include products sold as POLACOAT and holo screen by Da-Lite Screen Company (Warsaw, Ind.). In some embodiments, a black translucent flexible rear projection material is used. The material for source surface 117 can be attached to the frame using fasteners such as those sold under the trademark VELCRO, for example, and tensioned with extension rods outside the projected area, ensuring a flat and even projection surface. In some embodiments, each source surface 117i provides a maximum image frame height of, for example, 76" in the full 15'×15' configuration. A source surface 117i can have both 4:3 and 16:9 aspect ratios with the 76" given image frame height.

Figure 9:
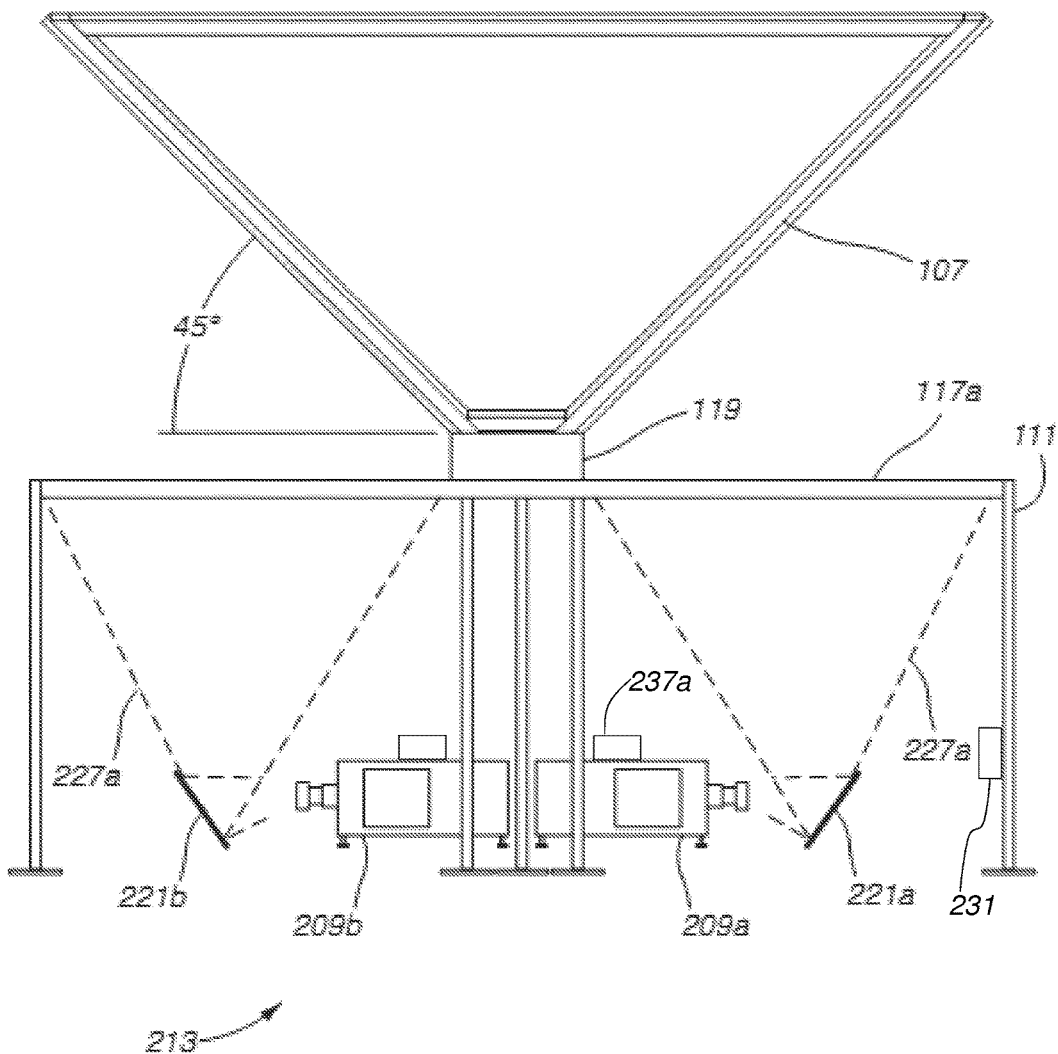
FIG. 9 shows a free stranding image display unit according to some embodiments.

FIG. 9 shows a unit 101 housing an exemplary projection system 213 according to certain embodiments. As shown in FIG. 9, frame 107 is mounted to base frame 111 by pillars 119. In some embodiments, projection system 213 includes projector 209a, 209b, . . . , 209n and mirrors 221a, 221b, . . . , 221n. Within projection system 213, projector 209i operates with mirror 209i to arrange light path 227i so that projector 209i is projecting an image or motion picture onto source surface 117i.

One benefit of the invention is that mounting frame 107 to base frame 111 by pillar 119 allows unit 101 to be constructed off-site in one step and later delivered to a site of operation. Set up at the site of operation is unexpectedly fast and easy, which may be due in part to the fact that image display surface 115i is fixed in location relative to image source surface 117i, and previously existing problems with tuning and calibrating the setup (e.g., where frame 107 and imaging system 213 are fully independent structurally from one another) are thereby obviated. It may be theorized that an integrated unit 101 as shown in FIG. 9 provides that complex orientation and calibration steps are dispensed with during initial fabrication with the unexpected result that installation at site is more easy and rapid that expected. Once unit 101 is set into the intended location, components of image system 213 are set within base frame 111 starting with, for example, projector 209i or mirror 221i.

Projector 209i may be any suitable projector known in the art. In some embodiments, project 209i has an output anywhere from 600 ANSI lumen to 12000 ANSI lumens, preferably within the range from 2000 ANSI lumens to 4500 ANSI lumens. In certain embodiments, projector 209i is the SP-H03 projector sold under the trademark PICO by Samsung (Samsung Town, Seoul, South Korea). Projector 209i can be provided by the RLM-W8 8,000 lumen WUXGA DLP projector sold by Barco, Inc. (Duluth, Ga.). In some embodiments, projector 209i is configured with a lens that provides an 0.8:1 throw ratio, meaning that the distance between the projector and the screen (the throw distance) can be about 0.8× the width of source surface 117i.

FIG. 9 illustrates methods of operating a display unit 101 and light system 213 according to certain embodiments. As shown in FIG. 9, beam 227i of projector 209i is projected onto minor 221i and directed up onto the source surface 117i. This creates an image that can be reflected by image surface 115i (e.g., the foil suspended on frame 107 above base frame 111). Projection systems can also be mounted above the pyramid shape so that the image is front projected and will not require the, for example, 6' of elevation in base frame 111. In this scenario, the legs supporting the base frame would be removed to lower the system down to ground elevation. The pyramid shape can also be deployed separately by using non-projection technologies to provide source surface 117i, such as, for example, LCD screen systems, LED screen systems or the digital display system sold under the trademarks CHRISTIE MICROTILES by Christie Digital Systems USA, Inc. (Cypress, Calif.).

FIG. 9 depicts a wholly-integrated, ground-supported system. A connection system including pillars 119 between base frame 111 and the display frame 107 allows for ground supported deployment. The connection system also allows unit 101 to be constructed in a finished, portable form and carried to a site for deployment (e.g., on a truck).

The system can be configured for multiple purposes in such a way that it allows for both front and rear projection or allows for other display device technologies such as the digital display system sold under the trademarks CHRISTIE MICROTILES by Christie Digital Systems USA, Inc. (Cypress, Calif.). A rear projection system may be suspended horizontally, for example. The system can be positioned so that it is hanging, mounted directly to a base frame or based on ground level.

The system can integrate high power projection units allowing for a brighter image in brighter environments, while at the same time coping with heat issues by integrating a portable or permanent fan 231, heat sink 237, other cooling devices, or a combination thereof into, for example, light system 213.

In some embodiments, the system includes a foil locking system, that will allow a quick lock of the foil into place increasing the ease of use, while minimizing the time and manpower needed to deploy the system. The invention of the present disclosure uses, for example, 20 k or more projection light units and can successfully deploy a 15'×15' unit on an exhibition floor, for example, with about 1000-1500 lux at floor level.

Figure 10:
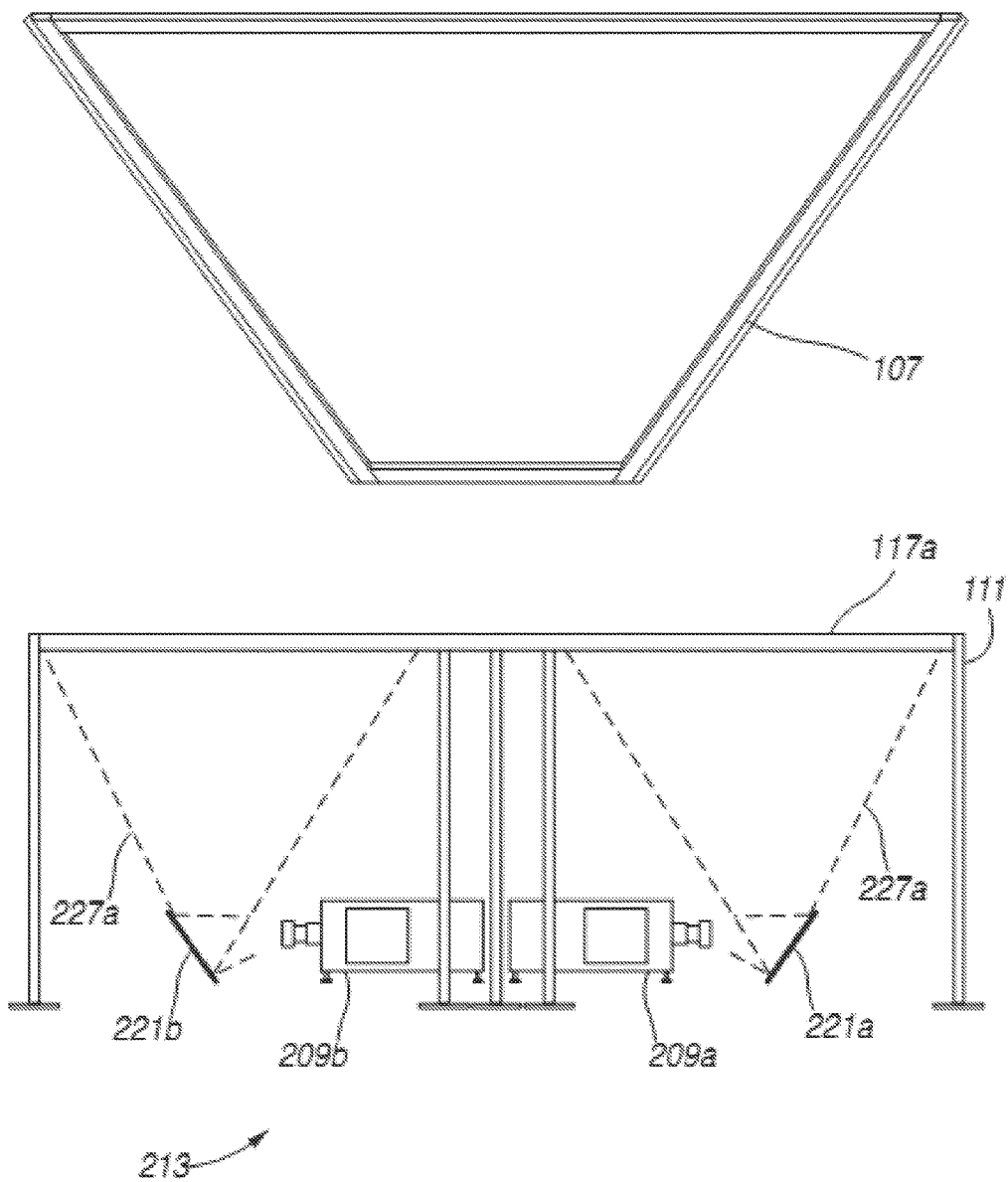
FIG. 10 shows a two-part image display system according to embodiments of the invention.

FIG. 10 shows a two-part image display system 101 according to embodiments of the invention. Frame 107 is suspended above base frame 111 using, for example, cables or in-place construction. Frame 107 is optionally separated from base frame 111 by free space to create appealing aesthetic affects. For example, image source surface 117*i* may be concealed in a floor or behind a plant or other architectural details. Image system 213 may include mirrors or lenses (e.g., a Fresnel lens) to direct the source images onto display surface 115*i*. A passerby may see only the parts of unit 101 embodied with frame 107 and thus perceive a three-dimensional hologram floating in space.

In some embodiments, unit 101 may be described according to three components: frame 107, base frame 111, and projection system 213. Those component generally include, without limit, the following items: frame 107 includes the frame itself made of tubing, for example about 4"×2", which can be steel or similar suitable material or prepunched galavanize angle iron (e.g., 1¼"), the material of the display surface 115 (e.g., biaxially-oriented polyethylene terephthalate (BoPET) such as that sold under the trademark MYLAR by E. I. du Pont de Nemours and Company (Wilmington, Del.)) that creates a refraction plane, and the attachment method. The overall physical dimension of the unit 101 may be about 15'×15'×15'.

In some embodiments, frame 107 may be assembled one side of the pyramid at a time. The term "pyramid" shape is a lose definition since each side of the "pyramid" may have four sides making it a rhombic or trapezoidal shape. Imagine a pyramid with the very top cut off and then inverted, e.g., an inverted truncated pyramid-like shape. Assembly from complete dismantled state may proceed by assembly of each of the four sides of the pyramid shape. Each side is then placed on the floor with the base of the inverted pyramid joint at the base. Two sides "swing" up to 45 degrees and are joint using flanges. The next side is joined and finally the last until the shape is complete and self balanced. Aircraft wire is attached and the shape is raised using either truss motor or manual labor. In some embodiments with the projection system 213 beneath base frame 111, the height of the bottom of the shape is governed by the elevation of the projection plane. For example, where the height is 6', for the content to appear as free floating at the center of frame 107, the height of the bottom of the shape has to be roughly at 7 ft. (the distance of the projected image to the refraction surface or termination point, will repeat itself in the refraction. Since the opening at the bottom is about 20" side to side, in order for the image to appear in the center of the shape or chamber, the pyramid must be raised half that distance above the projection surface.)

A semi-reflective (e.g., clear PET) foil is attached to frame 107. The foil is rolled out from the master roll onto a soft flat surface. Each sub-frame of frame 107 is placed on top of the foil and the foil is cut with box cutters using the frame as a guide. When cutting is complete and correct, adhesive grommet tabs are attached to the foil at about one every 9" roughly in-between the grommets that are welded to the frame sides. Adhesive grommet tabs suitable for use with the invention include those sold under the trademark BANNER UPS by E. L. Hatton Sales Co. (Wellington, Ohio). Adhesive grommet tabs are discussed in U.S. Pub 2002/0100856, the contents of which are hereby incorporated by reference in their entirety.

Once the adhesive grommet tabs are attached, a ¼" black bungee cord is run through the loops of the adhesive grommet tabs all the way around the foil. One end of the cord is anchored and the bungee cord is gradually pulled tight making the foil tighter. The final tightness is achieved by pulling the bungee cord over the grommets alternating opposite sides to achieve an even maximum tension. From this point, the frame is assembled and raised.

In certain embodiments, for an in-place installation, once the pyramid chamber is at its correct elevation the base is constructed beneath it. The base frame 111 can be made of aluminum extrusion profile and assembled from the center and out. Aluminum extrusion systems are discussed in U.S. Pat. No. 7,731,160 and U.S. Pat. No. 3,918,686, the contents of each of which are incorporated by reference herein in their entirety. The objects of base frame 111 are at least two-fold. One object is to carry the source projection surface 117*i* to a desired elevation (e.g., 6') and another object is to optionally hide the projection system 213 that creates the actual image (e.g., using skirt 105). When base frame 111 is completed, image source surface 117*i* is attached on top of the frame creating the "roof" of the base using a fastener, such as the hook-and-loop fastener sold under the trademark VELCRO. Any suitable material may be used. For example, a rear-projection screen material may be used, such as a standard dark grey rear projection surface material. In certain embodiments, base frame 111 provides four of image source surface 117*i* that correspond with the (e.g., four) sides of the pyramid chamber provided by frame 107. The darker the projection material is, the less visible it is in the refraction on the foil. When the material for image source surface 117*i* is attached, extension rods can be used to correct for sagging in the material. Common shower curtain rods may be used between the frame stabilizers to stretch each of the four corners of base frame 111. At this point the sides of base frame 111 are open. After projection hardware 213 is in place and calibrated, the sides are covered with drape 105, hiding the inner workings of unit 101.

Figure 11:
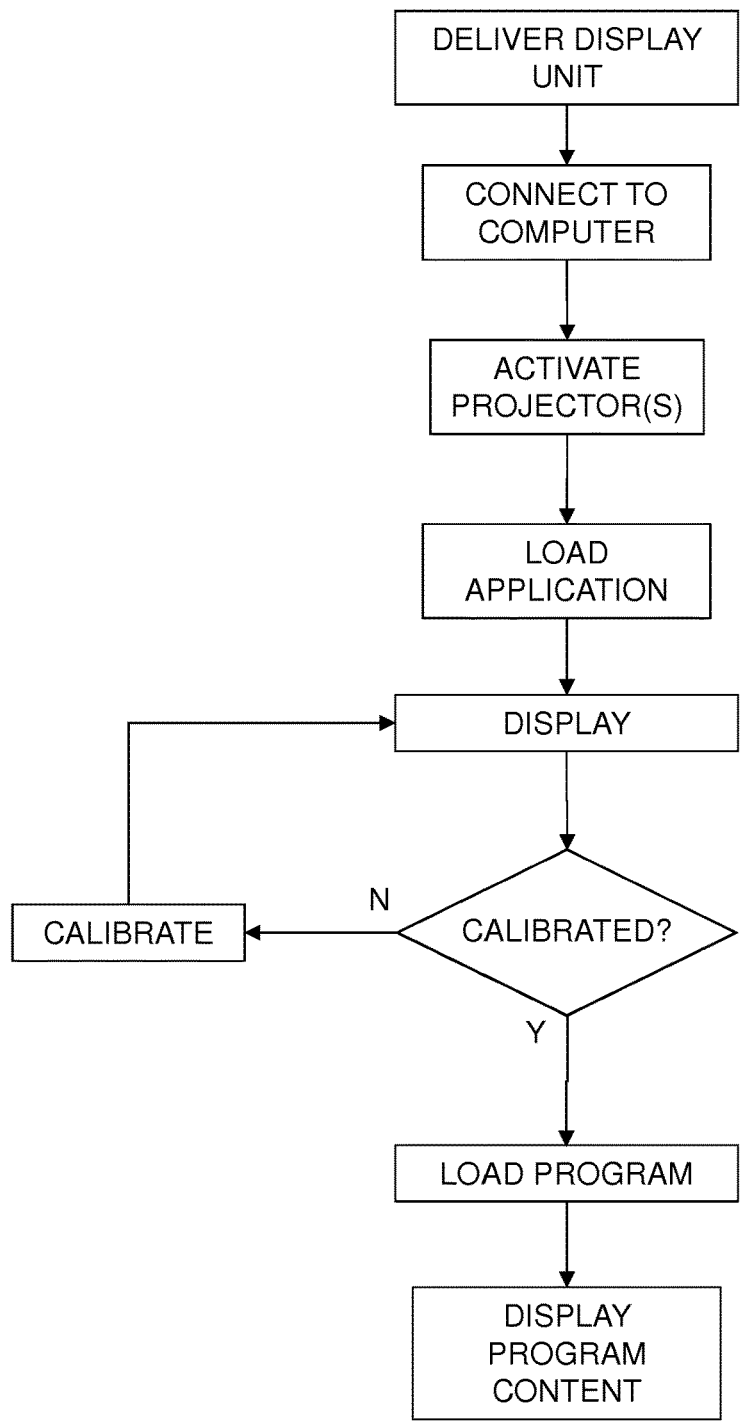
FIG. 11 diagrams a method of preparing a display.

FIG. 11 diagrams a method of preparing a display. A unit 101 is delivered. In certain embodiments, the frame components of unit 101, substantially as depicted in FIG. 9, are pre-fabricated and delivered as a single item. Display system 213 is placed within base frame 111 and the electronic components may be connected to a computer 505 (preferably via a VDA, discussed below). Projector 209*i* is activated, and a display application (e.g., a computer program) is loaded to execute on computer 505 or DMR 255 (see, e.g., FIG. 12). This causes a display to appear on unit 101. It can be determined if the display is calibrated, and if not, the display is calibrated (e.g., any image is centered on display surface 115*i*, distortions are corrected (skew, keystone, etc.). Then the image display program desired for the site (e.g., the customer's content) is loaded to run on computer 505 and the content is displayed on unit 101.

Figure 12:
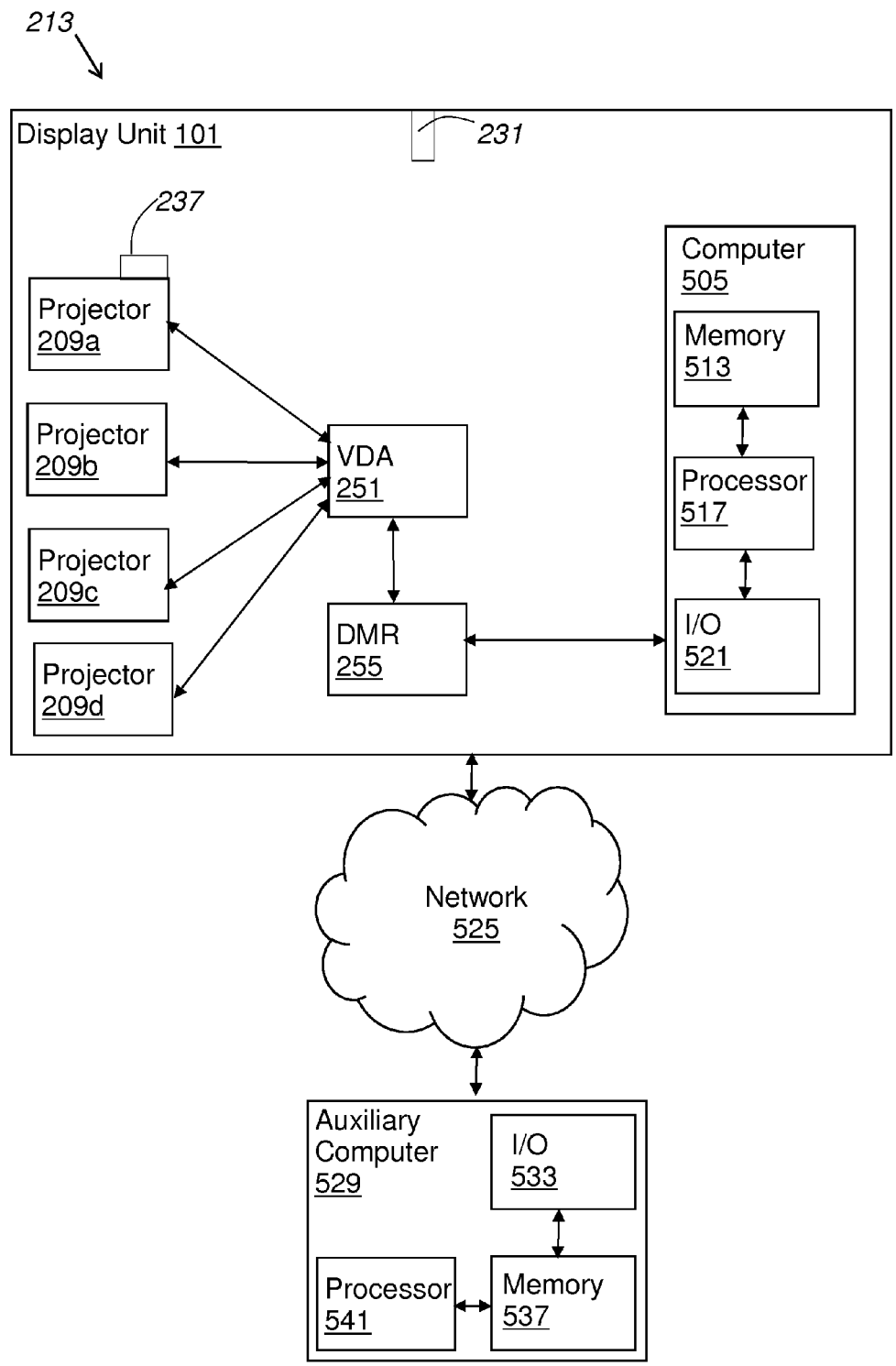
FIG. 12 gives a diagram of components of systems for image display according to embodiments of the invention.

FIG. 12 gives a diagram of components of systems for image display according to embodiments of the invention. In some embodiments, a digital media receiver (DMR) 255 (sometimes referred to as a media extender or digital media player), such as one of those sold under the trademarks MANTIS MC or MANTIS MG by Focus Enhancements (Sunnyvale, Calif.), is installed and connected to projector 209i using a video distribution amplifier (VDA) 251 such as the Extron P/2 DA4xi 1:4 VGA-QXGA distribution amplifier sold by Ivojo Multimedia, Ltd. (Newton Cross, Haverfordwest, UK). VDA 251 operates something like a splitter, sending the signal to each projector and boosting it as necessary. DMR 255 can operate like a library of source material to broadcast digital media according to its settings.

Suitable projectors for projector 209i include, for example, the BARCO W8 16:10 chipset projection units equipped with fixed short throw 0.76 lenses. In some embodiments, each of the units are placed on the floor as close to the center of the base frame as possible with the front of the projection unit facing the center of the side of the base frame (see, e.g., FIG. 6). The projection is deflected up to image source surface 117i using mirror 221i placed in front of the lenses at roughly 45 degrees. In certain embodiments, projector 209i pulls roughly 7 amps, which means that more than one of projection system 213 can safely run on one 20 amp circuit.

As shown in FIG. 12, display system may optionally include a computer 505 (e.g., including a tangible, non-transitory memory coupled to a processor 517 and input/output devices 521). Computer 505 can provide a user interface by which an operator may control the operation of system 213. Any or each these components may be communicatively coupled via network 525, which may further provide a connection to system 213 via an auxiliary computer 529 (e.g., including a tangible, non-transitory memory 537 coupled to a processor 541 and input/output devices 533). For example, auxiliary computer 529 may be remote server computer or a remote laptop or desktop computer from which an operator monitors operation of the system.

In some embodiments, after everything is connected components are booted according to sequence DMR 255 first, then VDA 251, followed by each projector 209 separated. This helps avoid unwanted power surges and potential power loss (i.e., don't send the "sound" or other signal (e.g., back EMF) of the boot-up downstream through the other components).

The player unit is activated and a calibration grid is played. Each unit is now calibrated for general geometry, overall alignment, brightness and color uniformity. When the grid is lined up correctly in the pyramid as viewed from the outside corners and all the way around it, the calibration is complete and content can be played.

Assembly is very rapid. Systems and methods of the invention require much less labor and time than prior art systems. In some embodiments, systems of the invention have both base frame 111 and pyramid chamber frame 107 as one free-standing unit (e.g., eliminates the need for hanging). This allows systems to be deployed without permanent installation.

In some embodiments, the foil is cut to reach or overlap the frame, and adhesive grommets are not used. In some embodiments, the projection system has a cradle component that allows for easy install and calibration of both mirror and projection unit. In some embodiments, a front projected system eliminates the need for the base structure under the pyramid shape. An alternative for bright environments is an LED screen system. Overall the system is agnostic and allows for real-time content editing capabilities.

Figure 13:
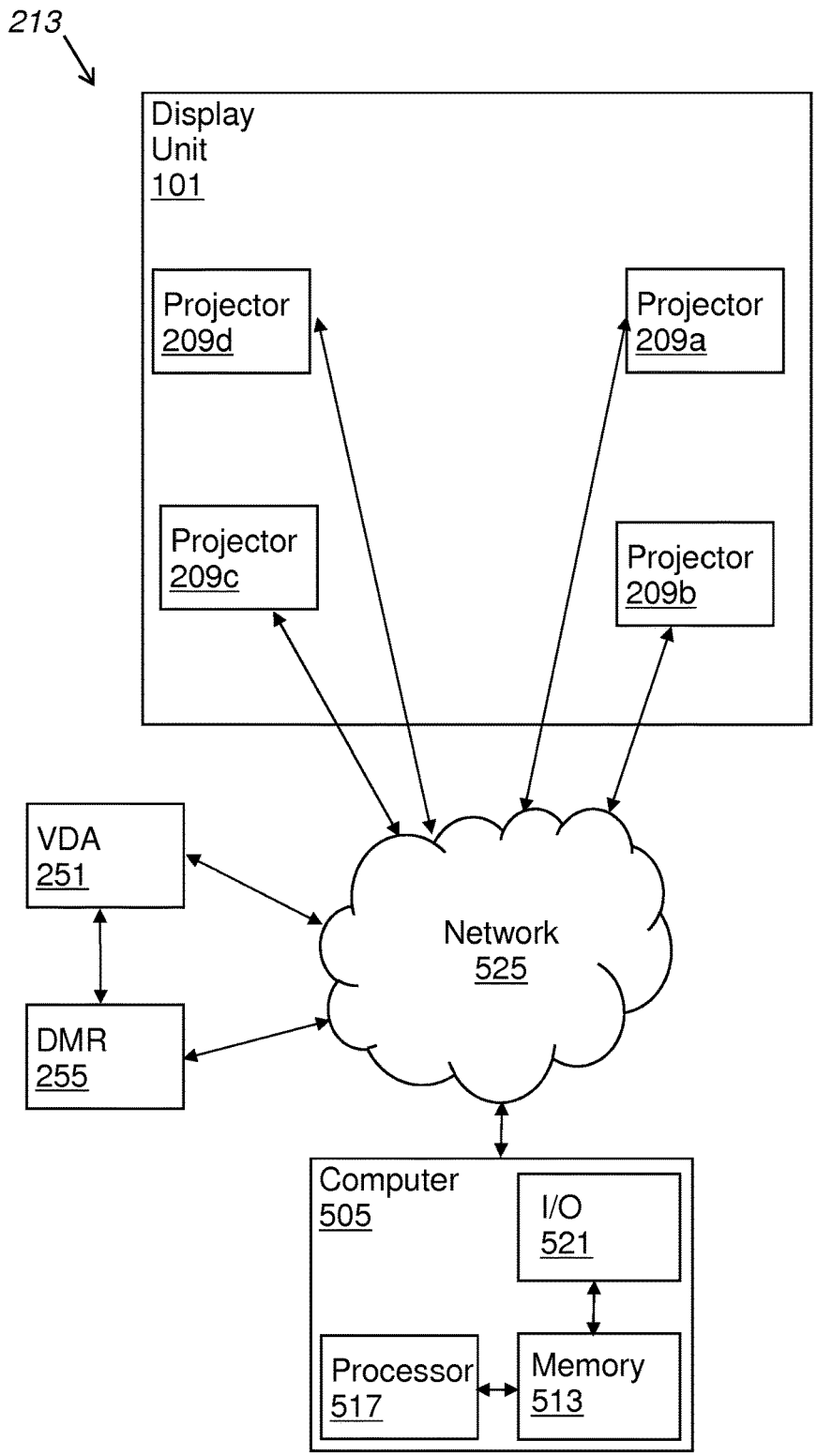
FIG. 13 gives a diagram of components of systems for image display according to embodiments of the invention.

FIG. 13 gives a diagram of components of systems for image display according to embodiments of the invention. As shown in FIG. 13 (e.g., compared to FIG. 12) an installation of system 213 can include a computer 505, a DMR 255, a VDA 251, or any combination thereof inside of display unit 101 (FIG. 12) or separated and spaced away from display unit 101 (FIG. 13). For example, depending on cable lengths, wireless connectivity, and related factors, any of those components may be across a lobby, in another location within the building, in a nearby building, or elsewhere.

Figure 14:
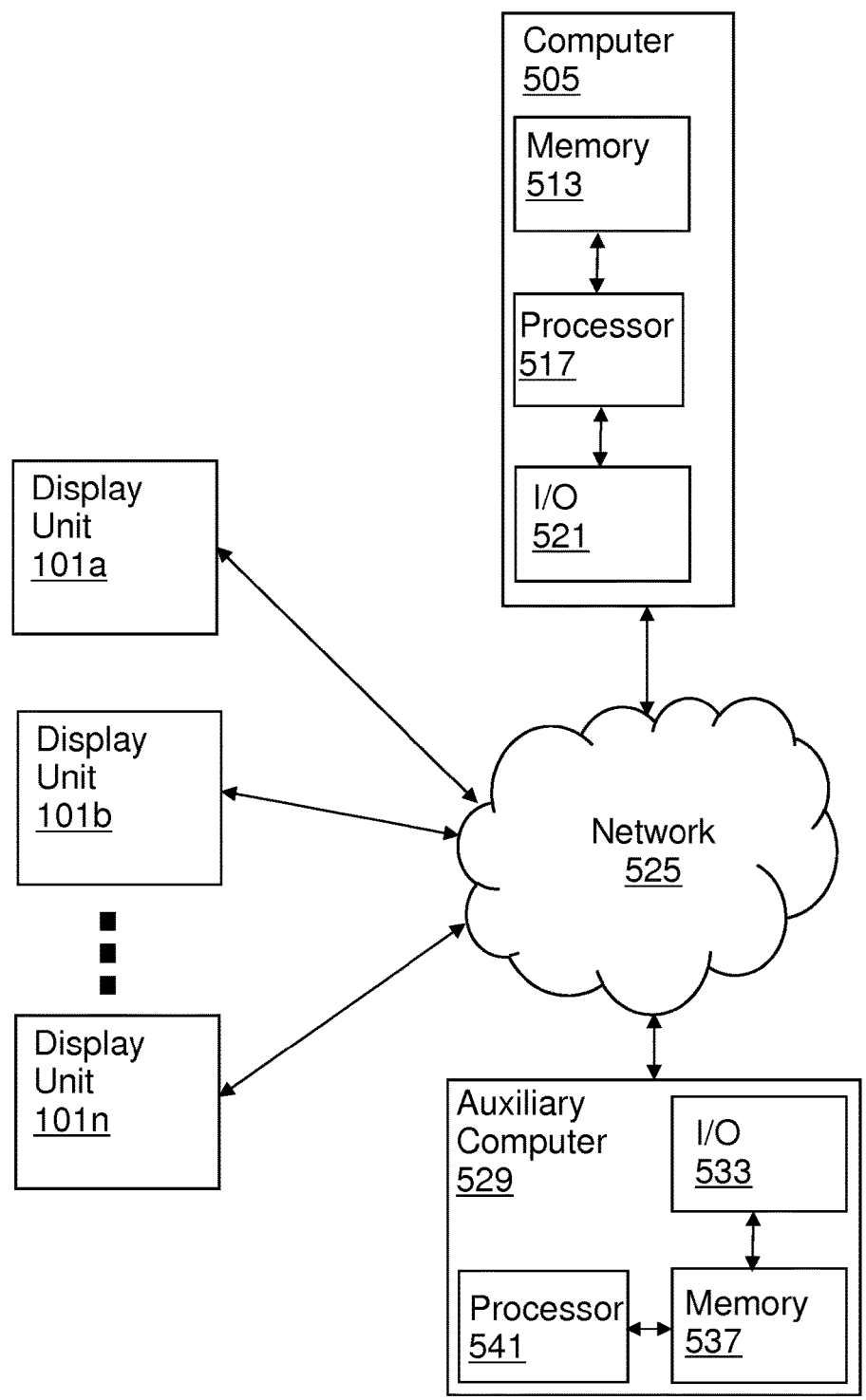
FIG. 14 gives a diagram of components of multi-unit systems for image display according to embodiments of the invention.

FIG. 14 gives a diagram of components of multi-unit systems for image display according to embodiments of the invention. Noting that DMR 255, VDA 251, or both can be located according to diagrams shown in FIG. 12 or 13, FIG. 14 shows an exemplary deployment for multiples of unit 101 to be operated by a single program or single computer 505, optionally in cooperation with auxiliary computer 529.

In general, a computer device is an apparatus with an input/output (I/O) mechanism coupled to a processor that is coupled to a tangible, non-transitory memory. In some embodiments, systems of the invention include one or more computer such as computer 505 or auxiliary computer 529. Any or all of the depicted computers may include, stored in memory, instructions for causing the machine to perform any one or more of the methodologies discussed herein. In some embodiments, systems of the invention are deployed in a networked deployment and network 525 represents the Internet, a LAN, a Wi-Fi network or a combination thereof. In certain embodiments, systems of the invention are deployed using applications or mobile apps. For example, either of computer 505 or auxiliary computer 529 could be a hand-held device such as a tablet computer or smart phone capable of operating a mobile app and operating systems of the invention via the mobile app. In various embodiments, machines of the invention can be, as necessary to perform the methodologies described herein, a personal computer (PC), a tablet PC (e.g., iPad, Samsung Galaxy tablet, Nexus 7 tablet computer sold by Google (Mountain View, Calif.), a set-top box (STB), a Personal Digital Assistant (PDA), a cellular telephone or smart phone, a web appliance, a network router, switch or bridge, or any machine capable of executing a set of instructions (sequential or otherwise) that specify actions to be taken by that machine. Further, where a computer may be illustrated as a single machine, the term "machine" shall also be taken to include any collection of machines that individually or jointly execute a set (or multiple sets) of instructions to perform any one or more of the methodologies discussed herein. In some embodiments, auxiliary computer 529 can include hardware such as a Hitachi Compute Blade 500 computer device sold by Hitachi Data Systems (Santa Clara, Calif.). A processor in a computer device can be, for example, a E5-2600 processor sold under the trademark Xeon by Intel Corporation (Santa Clara, Calif.).

In certain embodiments, one or more device of the invention is a custom device designed and constructed to implement methodologies described herein and is housed, for example, in a unique form-factor or a form-factor not typically associated with laptop, desktop, or tablet computers. For example, either or both of VDA 251 and DMR 255 may be provided as a custom-designed or other computing device and either or both may include a memory or processor as discussed herein, as well as input/output devices.

A computer generally includes one or more input/output (I/O) device. Computer systems or machines according to the invention may further include a video display unit (e.g., a liquid crystal display (LCD) or a cathode ray tube (CRT)). Computer systems or machines according to the invention can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem. Input-output devices generally includes one or a combination of monitor, keyboard, mouse, data jack (e.g., Ethernet port, modem jack, HDMI port, mini-HDMI port, USB port), Wi-Fi card, touchscreen (e.g., CRT, LCD, LED, AMOLED, Super AMOLED), pointing device, trackpad, microphone, speaker, light (e.g., LED), or light/image projection device.

A computer generally includes at least one processor. As one skilled in the art would recognize as necessary or best-suited for performance of the methods of the invention, computer systems or machines of the invention include one or more processors (e.g., a central processing unit (CPU) a graphics processing unit (GPU) or both), a main memory and a static memory, which communicate with each other via a bus. One of skill in the art will recognize that a processor may be provided by one or more processors including, for example, one or more of a single core or multi-core processor (e.g., AMD Phenom II X2, Intel Core Duo, AMD Phenom II X4, Intel Core i5, Intel Core i& Extreme Edition 980X, or Intel Xeon E7-2820). In certain embodiments, either of computer 505 or auxiliary computer 529 may be a notebook or desktop computer sold by Apple (Cupertino, Calif.) or a desktop, laptop, or similar PC-compatible computer such as a Dell Latitude E6520 PC laptop available from Dell Inc. (Round Rock, Tex.). Such a computer will typically include a suitable operating system such as, for example, Windows 7, Windows 8, Windows XP, all from Microsoft (Redmond, Wash.), OS X from Apple (Cupertino, Calif.), or Ubuntu Linux from Canonical Group Limited (London, UK). In some embodiments, either of computer 505 or auxiliary computer 529 may be a tablet or smart-phone form factor device and processor 517 or 541 can be provided by, for example, an ARM-based system-on-a-chip (SoC) processor such as the 1.2 GHz dual-core Exynos SoC processor from Samsung Electronics, (Samsung Town, Seoul, South Korea).

A computer generally includes memory. Computer memory generally refers to a machine-readable medium and may generally be present in the form of random access memory (RAM), read-only memory (ROM), or a combination thereof. A memory generally refers to one or more storage devices for storing data or carrying information, e.g., semiconductor, magnetic, magneto-optical disks, or optical disks. Information carriers for a memory suitable for embodying computer program instructions and data include any suitable form of memory that is tangible, non-transitory, non-volatile, or a combination thereof. In certain embodiments, a device of the invention includes a tangible, non-transitory computer readable medium for memory. Exemplary devices for use as memory include semiconductor memory devices, (e.g., EPROM, EEPROM, solid state drive (SSD), and flash memory devices e.g., SD, micro SD, SDXC, SDIO, SDHC cards); magnetic disks, (e.g., internal hard disks or removable disks); magneto-optical disks; and optical disks (e.g., CD and DVD disks).

While the machine-readable medium can in an exemplary embodiment be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories (e.g., subscriber identity module (SIM) card, secure digital card (SD card), or micro SD card), optical and magnetic media, and any other tangible storage media.

In some embodiments, a computer according to the invention, such as either or both of VDA 251 and DMR 255, includes a specialized device with processing or memory capabilities such as firmware, an application-specific integrated circuit (ASIC), or a field programmable gate array (FPGA). In general, firmware refers to a combination of persistent memory with program code and data stored in it. In general, an ASIC or an FPGA is an integrated circuit configured after manufacturing to operate as a device to implement methodologies of the invention. In some embodiments, a custom form-factor device or a device of the invention having a form factor other than a familiar laptop, tablet, or desktop computer form factor will include one or more of firmware, an ASIC, or an FPGA, and may further include I/O devices such as one or more of a monitor, button, switch, Ethernet port, Wi-Fi card, touchscreen, USB port, infrared device, or similar, or a combination thereof.

A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network. In certain embodiments, images to be displayed on display screen 115*i* are generated by the processing of an underlying data file that contains content (e.g., representing a customer's desired display content). The data may be image data such as videos or it may be 3D model data and the processor can generate views of interpretations of those data. The program instructing the processing and the data to be processed need not be stored on the same device.

A file can be a digital file, for example, stored on a hard drive, SSD, CD, or other tangible, non-transitory medium such as any of those discussed above. A file can be sent from one device to another over network 525 (e.g., as packets being sent between a server and a client, for example, through a Network Interface Card, modem, wireless card, or similar).

The software may also reside, completely or at least partially, within the main memory and/or within the processor during execution thereof by the computer system, the main memory and the processor also constituting machine-readable media. Exemplary systems and system architectures for use with the invention are described in U.S. Pub. 2011/0209133, U.S. Pub. 2011/0175923, and U.S. Pub. 2007/0112800, each of which is incorporated by reference herein in its entirety. The software may further be transmitted or received over network 525 via the network interface device.

Processing data to be displayed as images according to the invention involves transforming a tangible, non-transitory computer-readable medium, for example, by adding, removing, or rearranging particles (e.g., with a net charge or dipole moment into patterns of magnetization by read/write heads), the patterns then representing new collocations of information about objective physical phenomena desired by, and useful to, the user (e.g., a physical arrangement of particles that indicates a specific set of images to be displayed). In some embodiments, processing data to be displayed as images involves a physical transformation of material in tangible, non-transitory computer readable media (e.g., with certain optical properties so that optical read/write devices can then read the new and useful collocation of information, e.g., burning a CD-ROM). In some embodiments, processing data to be displayed as images includes transforming a physical flash memory apparatus such as NAND flash memory device and storing information by transforming physical elements in an array of memory cells made from floating-gate transistors. Methods of processing data to be displayed as images can be invoked manually or automatically by a program or command.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A display system comprising:
   a plurality of image source surfaces each comprising a black translucent rear projection material disposed within a base frame, each of the black translucent rear projection materials having a top surface and a bottom surface and arranged to present an image;
   an upper frame object comprising a plurality of display surfaces, wherein each one of the plurality of display surfaces is aligned with the top surface of one of the image source surfaces, thereby arranged to reflect one of the images so that content from the images is visible from all points along an arc extending around the object for more than 180° within a plane, wherein the display surfaces are provided by reflective polyethylene terephthalate foil mounted on the upper frame object;
   a plurality of digital projectors mounted in the base frame, each one of the plurality of digital projectors oriented to project light onto the bottom surface of one of the image source surfaces; and
   a cooling system including a fan mounted directly to the base frame and a heat sink mounted within the base frame, wherein the display surfaces and base frame containing the digital projectors and cooling system are pre-fabricated and configured to be transported in one piece.

2. The system of claim 1, wherein the plurality of image source surfaces consists of four image source surfaces.

3. The system of claim 1, further comprising a plurality of mirrors to direct the light path from the projectors to the image source surfaces.

4. The system of claim 1, wherein the reflective foil comprises polyethylene terephthalate.

5. The system of claim 1, wherein the arc extends around the object for 360° within a plane.

6. A method of displaying an image viewable from multiple directions, the method comprising:
   generating images using a plurality of digital projectors mounted within a base frame;
   cooling the digital projectors using a fan mounted on a portion of the base frame and within the base frame;
   projecting the images from the digital projectors onto a bottom surface of the plurality of image source surfaces each comprising a black translucent rear projection material mounted in the base frame; and
   reflecting the projected images off of a plurality of display surfaces provided by reflective polyethylene terephthalate foil mounted on an upper frame object, each display surface aligned with one of the image source surfaces so that content from the images is visible from all points along an arc extending around the object for more than 180° within a horizontal plane.

7. The method of claim 6, wherein the display surfaces are provided by reflective foil mounted on the upper frame object.

8. The method of claim 6, wherein the upper frame object comprises a truncated, inverted pyramid-like structure mounted to, and disposed above, the base frame.

9. The method of claim 8, wherein the digital projectors are connected to a computer.

10. The method of claim 9, wherein the plurality of image source surfaces consists of four image source surfaces.

11. The method of claim 10, wherein the base frame further comprises a plurality of mirrors to direct the projected images from the projectors to the image source surfaces.

12. The method of claim 11, wherein the arc in which the content is visible from all points extends around the object for 360° within a plane.

13. An apparatus for displaying a hologram-like image, the apparatus comprising:
   an inverted, truncated pyramid bearing semi-reflective facets visible from outside of the apparatus in all horizontal directions, the facets provided by reflective polyethylene terephthalate foil mounted on the truncated pyramid; and
   a base frame supporting the truncated pyramid and housing
      an imaging system comprising image source surfaces each comprising a black translucent rear projection material, each image source surface aligned with one of the facets and configured to display images beneath each of the facets, and digital projectors located beneath the image source surfaces and oriented to project the images onto a bottom surface of the image source surfaces,
      a cooling system comprising a fan disposed at an edge of the base frame, and
      a computing device comprising a tangible, non-transitory memory coupled to a processor adapted to generate the images displayed on the image source surfaces;

wherein the truncated pyramid and the base frame containing the digital projectors and cooling system are pre-fabricated and configured to be transported in one piece.

\* \* \* \* \*